United States Patent [19]

Miyazaki

[11] Patent Number: 5,068,683

[45] Date of Patent: Nov. 26, 1991

[54] ACCESSORY SHOE ADAPTER FOR VIDEO CAMERA ATTACHED ON BATTERY MOUNT PORTION

[75] Inventor: Kiyoshi Miyazaki, Tokyo, Japan

[73] Assignee: Kabushiki Kaisha LPL, Higasimurayama, Japan

[21] Appl. No.: 575,185

[22] Filed: Aug. 29, 1990

[30] Foreign Application Priority Data

Mar. 16, 1990 [JP] Japan .............................. 2-27336[U]

[51] Int. Cl.⁵ ................................................ G03B 7/26
[52] U.S. Cl. ...................................... 354/484; 354/81;
354/295; 354/288; 358/906
[58] Field of Search ................... 354/484, 81, 293, 75,
354/76, 295, 288; 358/906

[56] References Cited

U.S. PATENT DOCUMENTS 4,924,246 5/1990 Yamada ................................ 358/906

FOREIGN PATENT DOCUMENTS 63-99672 6/1988 Japan .
2-79143 6/1990 Japan .

*Primary Examiner*—W. B. Perkey
*Assistant Examiner*—Cassandra C. Spyrou
*Attorney, Agent, or Firm*—Christie, Parker & Hale

[57] ABSTRACT

A video camera accessory shoe adapter includes an accessory shoe extending from an adapter body having on its opposite sides a camera mounting portion and a battery mounting portion. The camera mounting portion of the adapter is formed to be mounted on the battery mounting portion of the video camera, and the battery mounting portion of the adapter is so formed that a battery can be mounted thereon. Electrical contacts, which correspond to electrical contracts in the battery mounting portion of the video camera, are provided in the camera mounting portion of the adapter. Electrical contacts are also provided in the battery mounting portion of the adapter, and the electrical contacts on opposite sides of the adapter are electrically connected.

2 Claims, 2 Drawing Sheets

ACCESSORY SHOE ADAPTER FOR VIDEO CAMERA ATTACHED ON BATTERY MOUNT PORTION

FIELD OF THE INVENTION

The present invention relates to an accessory shoe adapter for video camera.

BACKGROUND OF THE INVENTION

To attach the accessories for video camera such as light, microphone and liquid crystal monitor to the video camera, the threaded hole formed in the camera bottom for connection of the tripod has usually been utilized. Specifically, a procedure has conventionally been followed in which the shoe is attached to the camera body by threading the clamping screw into said threaded hole and then the accessory is attached to the shoe. With such procedure, however, the shoe projects laterally of the camera body and often obstructs smooth manipulation of the camera. The shoe laterally projects from the center of the camera and, with a consequence, makes a rapid adjustment of the accessory difficult. Additionally, when it is desired to store the camera temporarily in the camera case, the clamping screw must be loosened to remove the shoe. Thus, the accessory shoe of prior art has been very inconvenient for handling.

Although many users of video camera have had a serious demand for mountability of various accessories on the video camera, the conventional shoe mounting procedure as mentioned above has prevented such demand from being fulfilled.

SUMMARY OF THE INVENTION

Preferably, the present invention has an accessory shoe adapter utilizing the battery pack mount of the video camera, and a shoe and an adapter body carrying the shoe. The adapter body is formed on its front and rear sides with a camera mount and a battery pack mount, respectively, which are configured in a mutually complementary relationship.

More specifically, the camera mount of the shoe adapter is attached to the battery pack mount of the video camera instead of directly mounting a battery pack thereon and then the battery pack is mounted on the battery pack mount formed on the side of the adapter body opposed to said camera mount in a complementary geometry with respect to the camera mount. The camera mount of the shoe adapter is provided with a set of electric contacts corresponding to those provided on the battery pack mount of the video camera and the battery pack mount of the adapter body also is provided with a similar set of electric contacts corresponding to those provided on the camera mount so that these sets of electric contacts are electrically connected to each other.

The shoe is supported by the slide plate slidably provided within the adapter body and preferably position-adjusted by this slide plate.

The accessory shoe adapter of this invention is preferably constructed so that the camera mount of the adapter body is attached to the battery pack mount of the video camera and then the battery pack is mounted on the battery pack mount of the adapter body. Accordingly, the shoe adapter can be attached to or removed from the video camera with one touch just as when the battery pack is mounted on or removed from the video camera.

Particularly when the present invention is applied to so-called handy type video camera adapted to have the battery pack mounted vertically at the rear side of the camera body, the camera can be smoothly manipulated without being obstructed by the shoe because the shoe can be positioned above the adapter and does not project laterally of the camera. In addition, adjustment of the accessories can be also easily done, since the shoe adapter is located behind the camera.

Furthermore, the adapter body of the invention is provided at corresponding locations on front and rear sides with sets of electric contacts so that these sets of electric contacts are electrically connected to each other. Such feature of the invention allows the commercially available battery packs exclusively for the video camera to be directly used.

DETAILED DESCRIPTION

Figures 1, 2, 3:
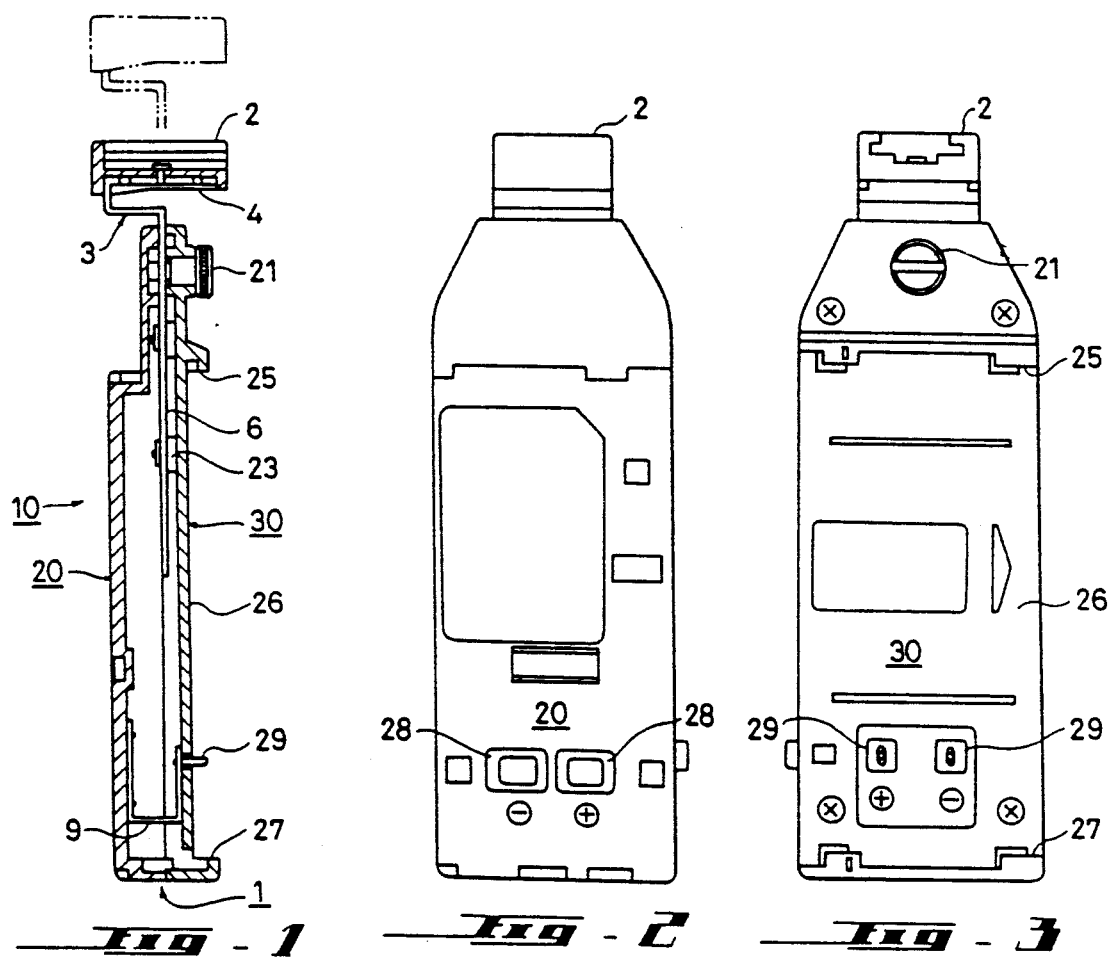
FIG. 1 is a sectional side view showing an embodiment of the device constructed according to the present invention.
FIG. 2 is a rear view of the device, showing a configuration on a side at which this device will be attached to the battery pack mount of the video camera.
FIG. 3 is a front view of the device on a side at which the device is fitted with the batter pack.

FIG. 1 is a sectional side view showing a preferred embodiment of the present invention.

An accessory shoe adapter 1 comprises an adapter body 10 provided with a shoe 2 for mounting of accessories such as camera slide, microphone and liquid crystal monitor, wherein said shoe 2 is supported by a slide plate 3 which is vertically slidable within the adapter body 10. The adapter body 10 has a camera mount 20 and a battery pack mount 30 opposed to said camera mount 20. The camera mount 20 is configured so as to fit into a battery pack mount (not shown) of a commercially available video camera body, which does not have a battery pack mounted thereon. The battery pack mount 30 is configured so that the battery pack for the video camera body can be mounted thereon.

The slide plate 3 consists of a head 4 on which the shoe 2 is stationarily mounted and a leg 6 vertically extending downward from said head 4. The leg 6 slidably moves longitudinally of the adapter under control of a shoe slide screw 21 and a guide 23. In this embodiment the slide plate 3 can be vertically moved when said shoe slide screw 21 is loosened.

The camera mount 20 is configured in the well known manner so as to be mounted to or detached from the battery pack mount of the commercially available video camera with one touch.

The battery pack mount 30 of the adapter body comprises an upper end guide 25, a battery pack receiving surface 26 and a lower end guide 27 so that the battery pack for the commercially available video camera can be fitted into a recess defined by the upper end guide 25, the battery pack receiving surface 26 and the lower end guide 27 with one touch.

FIG. 2 is a rear view showing the camera mount 20 adapted to be coupled to the battery pack mount of the video camera.

The camera mount 20 is provided with a set of electric contacts 28, 28 to establish an electric connection when the camera mount 20 is mounted to the battery pack mount of the video camera. These electric contacts 28, 28 extend through the camera mount 20 so as to be electrically connected to respective conductors 9.

FIG. 3 is a front view showing the battery pack mount 30 adapted to receive a battery pack for the video camera.

The battery pack mount 30 is provided with electric contacts 29, 29 to establish an electric connection when the commercially available battery pack for video camera is fitted into said battery pack mount 30. The electric contacts 29, 29 extend through the battery pack mount 30 so as to be electrically connected to the respective conductors 9.

In this manner, the battery pack is electrically connected through the electric contacts 29, 29, the conductors 9 and the electric contacts 28, 28 to the battery pack mount of the video camera.

Figure 4:
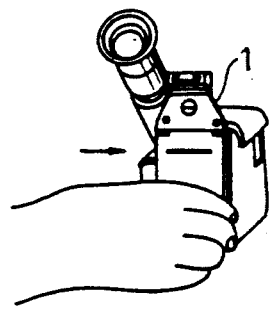
FIG. 4 is a perspective view exemplifying a manner in which the device is attached to the video camera.

FIG. 4 exemplifies a manner in which the shoe adapter of the invention is mounted on the video camera, wherein after the battery pack has been removed from the battery mount of the video camera, the shoe adapter 1 is attached to this battery pack mount of the video camera by rightwardly sliding the shoe adapter 1 from the left end of said battery pack mount of the camera body.

Figure 5:
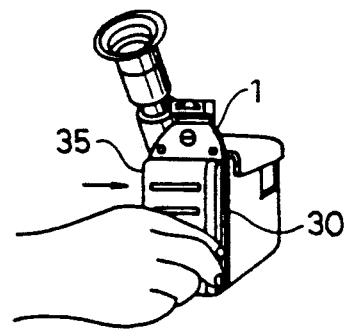
FIG. 5 is a perspective view exemplifying a manner in which the battery pack is mounted on the device.

FIG. 5 exemplifies a manner in which the shoe adapter I is mounted with a battery pack 35, wherein the battery pack 35 is fitted into the battery pack mount 30 of the shoe adapter 1 in the same manner as has been mentioned in connection with FIG. 4, i.e., by rightwardly sliding the battery pack from the left end of said battery pack mount 30.

Figure 6:
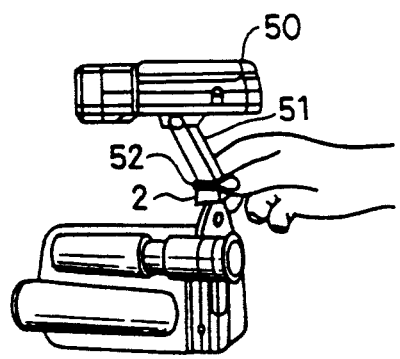
FIG. 6 is a perspective view exemplifying a manner in which an accessory is attached to the device.

FIG. 6 exemplifies a manner in which an accessory is mounted on the shoe 2, wherein a leg 51 of a camera light 50 is inserted into the shoe 2 and then a clamping screw 52 is tightened.

Figure 7:
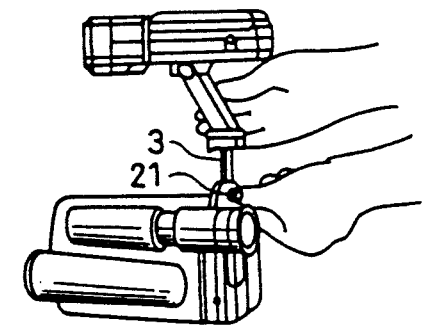
FIG. 7 is a perspective view exemplifying a manner in which a height of the accessory is adjusted.

FIG. 7 exemplifies a manner in which a height of the accessory is adjusted, wherein, after the slide screw 21 has been loosened, the slide plate 3 is vertically adjusted.

Accordingly, the foregoing description should not be read as pertaining only to the precise structures and techniques described, but rather should be read consistent with, and as support for, the following claims, which are to have their fullest fast fair scope.

What is claimed is:

1. Accessory shoe adapter for video camera comprising:

a shoe mount for accessories;

an adapter body supporting said shoe mount, said adapter body having front and rear sides, a camera mount adapted to be attached to a battery pack mount of the video camera and a battery pack mount adapted to have a battery pack mounted thereon;

said camera mount and said battery pack mount of the adapter body being formed on the front and rear sides of the adapter body, respectively, so as to present mutually complementary geometries; and said complementary geometries comprising a pair of electric contacts provided with the camera mount corresponding to electric contacts provided on the battery pack mount of the video camera and said battery pack mount of the adapter body being also provided with a pair of electric contacts at locations corresponding to, and electrically connected to, said pair of electric contacts on the camera mount so that, with said battery pack mounted on said adapter and said adapter attached to said video camera battery pack mount, said shoe mount is secured to said camera, and said camera is electrically powered by said battery pack through said adapter.

2. Accessory shoe adapter as recited in claim 1, wherein said shoe is supported by a slide plate slidably provided within said adapter body.

* * * * *

UNITED STATES PATENT AND TRADEMARK OFFICE
CERTIFICATE OF CORRECTION

PATENT NO. : 5,068,683
DATED : November 26, 1991
INVENTOR(S) : Kiyoshi Miyazaki

It is certified that error appears in the above-identified patent and that said Letters Patent is hereby corrected as shown below:

On the Title page

ABSTRACT, Line 9, change "contracts" to -- contacts --.

Column 2, line 16, after "Such" insert -- a --.
Column 2, line 28, change "batter" to -- battery --.
Column 3, line 37, change "adapter I" to -- adapter 1 --.
Column 4, line 11, after "fullest" delete "fast".

Signed and Sealed this

Eighth Day of June, 1993

Attest:

MICHAEL K. KIRK

Attesting Officer
Acting Commissioner of Patents and Trademarks